Aug. 11, 1970  F. V. GUERRERO  3,523,667
CONDUIT SPACER
Filed Feb. 7, 1968
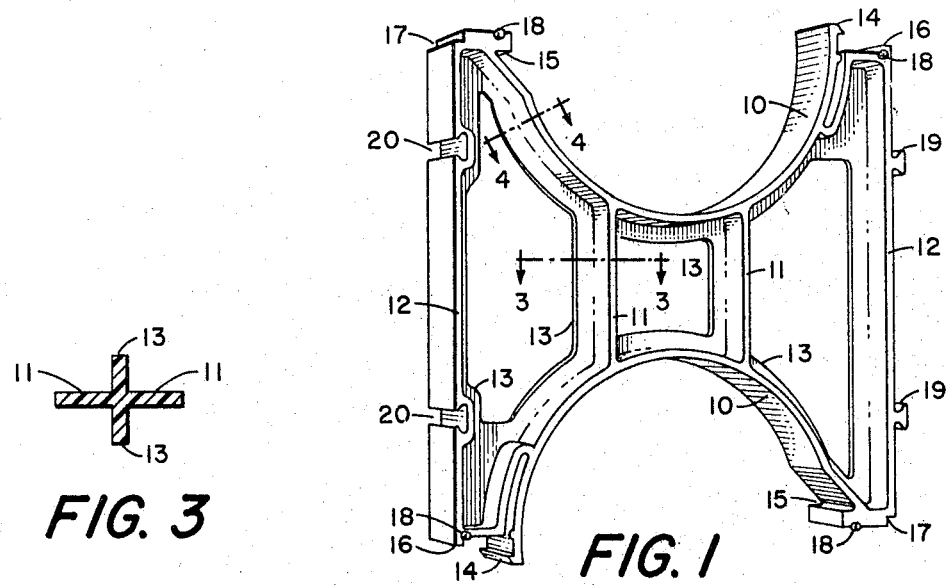
FIG. 3
FIG. 1
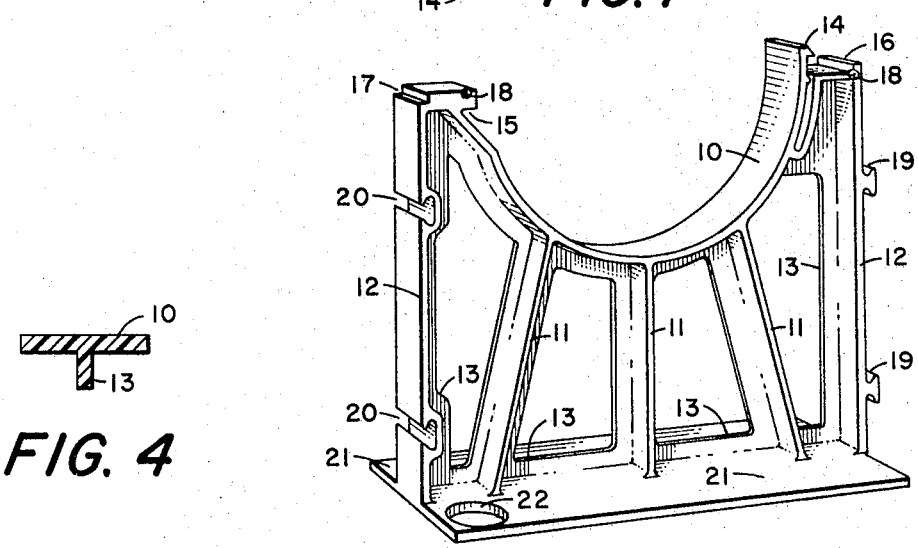
FIG. 4
FIG. 2
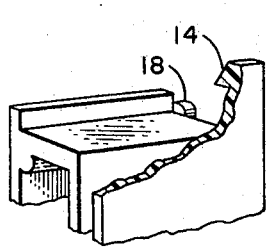
FIG. 5
INVENTOR.
FERNANDO V. GUERRERO
BY
William C. Michesell Jr.
ATTORNEY

United States Patent Office 3,523,667
Patented Aug. 11, 1970

3,523,667
CONDUIT SPACER
Fernando V. Guerrero, Chagrin Falls, Ohio, assignor to Continental Oil Company, Ponca City, Okla., a corporation of Delaware
Filed Feb. 7, 1968, Ser. No. 703,636
Int. Cl. F16l 3/10
U.S. Cl. 248—49                                           6 Claims

ABSTRACT OF THE DISCLOSURE

Spacer module for holding pipes or conduits in parallel spaced relationship wherein the sides and the pipe-receiving end surface are provided with interlocking means to join adjacent modules.

DISCLOSURE

This invention relates to a spacer module. In one aspect, the invention relates to a unitary plastic module having integral engaging means adjacent the pipe-receiving surface, whereby two such modules can be interlocked so as to surround the pipe. In another aspect, such module is additionally provided with engaging means on its side surfaces.

Conduit spacers are commonly used in spacing underground conduits for power conducting lines. Concrete is poured around the conduits and spacers. This mass of concrete about the conduits is often required to carry considerable loads comprising not only the weight of the ground covering the conduits, but where the conduits are laid under streets this concrete must also bear the weight of traffic upon the street. Since these conduit spacers are arranged in tiers one upon the other, it is essential that the concrete on opposite sides of the spacer should be joined into a homogeneous whole otherwise a joint will result which will cause, under certain loads, a fault or rupture in the concrete body thereby either closing off the conduits or partially closing them in the area of the fault.

The invention can best be understood by reference to the drawing, in which:

FIG. 1 represents a perspective view of one embodiment of my invention,

FIG. 2 represents a perspective view of another embodiment of my invention,

FIGS. 3 and 4 represent cross-sectional views, and

FIG. 5 represents a detail of one portion of the invention.

The spacer of my invention is most advantageously comprised of a unitary molding of plastic, such as vinyl resins, acrylates, ureaformaldehyde, acrylonitrile-butadiene-styrene, etc., or of metals such as aluminum, although it will be recognized that each module can be molded or otherwise formed in two or more pieces, and subsequently assembled.

Referring now to the drawing, and to FIG. 1 in particular, the embodiment shown therein is provided with two arcuately-shaped sides 10 which are sized and shaped to receive a given diameter pipe or conduit. Sides 10 are of a suitable thickness to provide strength and of a suitable width to provide a bearing surface for the pipe or conduit and preferably to prevent "rocking" or skewing of the module with respect to the pipe or conduit. Sides 10 each encompass an arc of about 180°, so that two such modules, when interlocked, will completely surround the conduit, as will be explained later. The module is also provided with one or more support posts 11, and with side posts 12. The entire frame assembly comprising sides 10 and posts 11 and 12 can be provided with stiffening ribs 13. Thus, the module as described preferably comprises an open framework, which is readily surrounded by poured concrete, although it will be recognized that the various openings between the structural members of the module need not be provided, but can be closed by extending ribs 13. The open framework is preferred not only for ease of concrete flow, but also for lightness and economy of material.

One important feature of my invention resides in the interlocking means which are provided adjacent the ends of sides 10. In the preferred embodiment shown, this interlock comprises a hook 14 at one end of each side 10 and a mating notch 15 at the other end of each side 10. These are preferably arranged on diagonally-opposite "corners" of the module, as shown in the figure. Hook 14 comprises an integral extension of side 10, and is of sufficient thickness to be stiffly resilient; the appropriate thickness will of course vary with the material of construction. Notch 15 is sufficiently outwardly displaced from the arc of side 10 to allow for the thickness of hook 14. In another embodiment of my invention (not shown), such a hook-and-notch arrangement is provided as an extension of and a notch into the ends of each side 12, respectively. Using either embodiment of hook-and-notch just discussed, it can be seen that two adjacent modules can be releasably engaged so as to surround a conduit; if for any reason it is decided to dis-assemble the modules, such can be effected non-destructively. Another interlocking embodiment of my invention (not shown) comprises an arrow-shaped or grooved conical projection at one extremity of a side 10, and a mating hole at the other extremity of the side 10. In this embodiment, the projection is forced into the hole, and typically cannot be dis-assembled without breaking off the projection.

Another feature of my invention resides in provision of protrusion 16 and notch 17 adjacent respective ends of sides 10, which cooperate to prevent lateral movement between two adjacent engaged modules. Thus, when two modules are "stacked," i.e. interlocked in a vertical arrangement, for instance with a conduit between their respective faces 10, hooks 14 and grooves 15 cooperate to prevent their moving vertically with respect to each other, while, as just explained, protrusion 16 and notch 17 prevent relative lateral movement.

Still another feature of my invention resides in provision of "buttons" 18, as can be seen in detail in FIG. 5. These can be simply a hemispherical or other protrusion, which projects partially beyond the surface of the edge to which it is attached. When two modules incorporating these "buttons" are engaged, they are prevented from moving relative to each other in a direction axially of a conduit between the modules, thus preventing a hook 14 from sliding endwise out of engagement with a notch 15.

Yet another feature of my invention resides in provision of engaging or interlocking means along side posts 12. In the embodiment shown, these comprise a dovetail or tongue-and-groove arrangement such as male members 19 and female portions 20, although it will be obvious that other configurations are suitable. These means serve to interlock modules in a side-by-side arrangement, and can be slightly tapered, if desired, to allow for frictional retention once engaged.

Turning now to FIG. 2, this module exhibits all the features of that of FIG. 1, except that one of the arcuate sides 10 is replaced by a base 21. This module can be used at the top and/or bottom of a vertical stack of the FIG. 1 modules and can, if desired, be provided with suitable holes 22 to allow staking of the base in position in an earthen trench or the like.

The following example is offered by way of illustration, and is not intended to be limiting.

Example

Modules of the configurations shown in FIGS. 1 and 2 were molded of a plastic resin, and each module was a unitary piece. The modules were made for 4" conduit (about 4½" O.D.). The radius of faces 10 was about 2 5/16". Sides 10 and posts 11 and 12 were all about 7/8" wide (deep) by about 1/8" thick, except where thickened for reinforcement as shown in the figures. Webs 13 averaged about 1/4" wide and were about 3/32" thick. Sides 12 were about 6½" long on the FIG. 1 module, and about 5¼" long on the FIG. 2 module, the former dimension of course governing the vertical distance between conduit center lines. Module widths, excluding male members 19, was about 6½", which governs horizontal distance between conduit centerlines. Base 21 was about 2 7/8" deep and about 1/8" thick, with 3/4" diameter holes 22. The modules functioned in an excellent manner, and formed a rigid structure when interlocked in horizontal and vertical stacks.

Reasonable variation and modification are possible within the scope of this disclosure.

What is claimed is:

1. A spacer comprising an element of generally rectangular configuration wherein:
 (a) at least one of the sides is curved inwardly of said rectangle through an arc of about 180°, being adapted to receive a cylindrical pipe or conduit adjacent said arcuate side with its axis in a relationship perpendicular to the plane of said rectangle, and
 (b) integral means are provided adjacent the extremities of said arc adapted to engage with a similar element in an adjacent position, the integral means at one of said extremities comprising an integral resilient hook means comprising an extremity portion of said arc, and the integral means at the other of said extremities comprising a recess means adapted to receive such a hook means.

2. The element of claim 1 wherein the side opposite said one of said sides is provided with a generally planar surface along its boundary and parallel to said axis.

3. The element of claim 1 wherein the side opposite said one of said sides also contains the elements of paragraphs (a) and (b).

4. The element of claim 1 further provided with integral means on two remaining and opposed sides of said rectangle adapted to engage with similar elements in adjacent positions.

5. The element of claim 4 wherein said integral means adapted to engage are adapted to releasably engage.

6. The element of claim 4 further including means adjacent said extremities adapted to prevent movement of said element relative to an adjacent engaged similar element in a direction along said axis.

References Cited

UNITED STATES PATENTS

| | | | |
|---|---|---|---|
| 2,686,643 | 8/1954 | Bloom | 248—49 |
| 2,963,539 | 12/1960 | Hynes | 248—68 X |
| 3,023,989 | 3/1962 | White | 248—68 |
| 3,188,030 | 6/1965 | Fischer | 248—68 |

CHANCELLOR E. HARRIS, Primary Examiner